United States Patent [19]

Garner

[11] Patent Number: 5,074,777
[45] Date of Patent: Dec. 24, 1991

[54] APPARATUS FOR MAKING A SPLIT PIE

[76] Inventor: Dennis B. Garner, 55 S. La Arboleta St., Gilbert, Ariz. 85234

[21] Appl. No.: 455,558

[22] Filed: Dec. 21, 1989

[51] Int. Cl.$^5$ .......................... A21B 3/13; A21C 11/10
[52] U.S. Cl. ...................................... 425/289; 30/303; 99/DIG. 15; 220/531; 249/131; 249/132; 249/171; 249/203
[58] Field of Search .................. 249/52, 131, 132, 170, 249/171, 187.1, DIG. 1, 203; 99/DIG. 15; 220/529, 531, 534; 30/114, 123, 303; 425/289

[56] References Cited

U.S. PATENT DOCUMENTS

| | | | |
|---|---|---|---|
| 64,905 | 5/1867 | Porter | 220/529 |
| 348,839 | 8/1886 | Grosz | 99/DIG. 15 |
| 731,417 | 6/1903 | Thorne | 249/171 |
| 850,022 | 4/1907 | Lewis | 99/DIG. 15 |
| 1,290,186 | 1/1919 | Held | 99/DIG. 15 |
| 1,371,195 | 3/1921 | Boyce | 99/DIG. 15 |
| 1,613,223 | 1/1927 | Davis | 99/DIG. 15 |
| 1,647,186 | 11/1927 | Miles et al. | 220/529 |
| 2,081,078 | 5/1937 | Watson | 249/131 |
| 2,327,988 | 8/1943 | Bassett | 249/131 |
| 2,598,789 | 6/1952 | Harrell | 220/531 |
| 3,060,838 | 10/1962 | Priore | 99/DIG. 15 |
| 3,139,229 | 6/1964 | De Pasquale | 220/529 |
| 3,677,168 | 7/1972 | Bell | 99/DIG. 15 |
| 4,759,706 | 7/1988 | Damianakos et al. | 249/170 |

FOREIGN PATENT DOCUMENTS

| | | | |
|---|---|---|---|
| 764543 | 5/1934 | France | 220/529 |
| 648039 | 12/1950 | United Kingdom | 220/531 |

Primary Examiner—James C. Housel
Attorney, Agent, or Firm—Cahill, Sutton & Thomas

[57] ABSTRACT

A pie dividing assembly adapted to be inserted into a conventional circular pie pan once it is covered with a bottom sheet or layer of pie dough for separating the pie into a plurality of separate and distinct pie sections, preferably two, each adapted to receive a different and distinct pie filling therein before an optional top layer or cover of pie dough is placed thereover and the pie baked. Normally, after the pie is at least partialy baked, approximately ⅜ baked, to where the pie filling has set, the pie divider is removed and the pie allowed to bake until done at which time the fully baked single unitary pie will have a plurality of sections each having a different and distinct pie filling therein. In the preferred embodiment of the present invention, the pie divider separates the pie into two equally dimensioned halves but embodiments are provided for separating the pie into three, four, six, eight, etc. Dimensionally equal or unequal sections, as desried. The invention also contemplates a split-filling pie made as a product by process, and a method of making a split-filling pie. Another embodiment is provided for dividing a pizza into a plurality of different and distinct slices before the topping or combination of toppings is added.

2 Claims, 2 Drawing Sheets

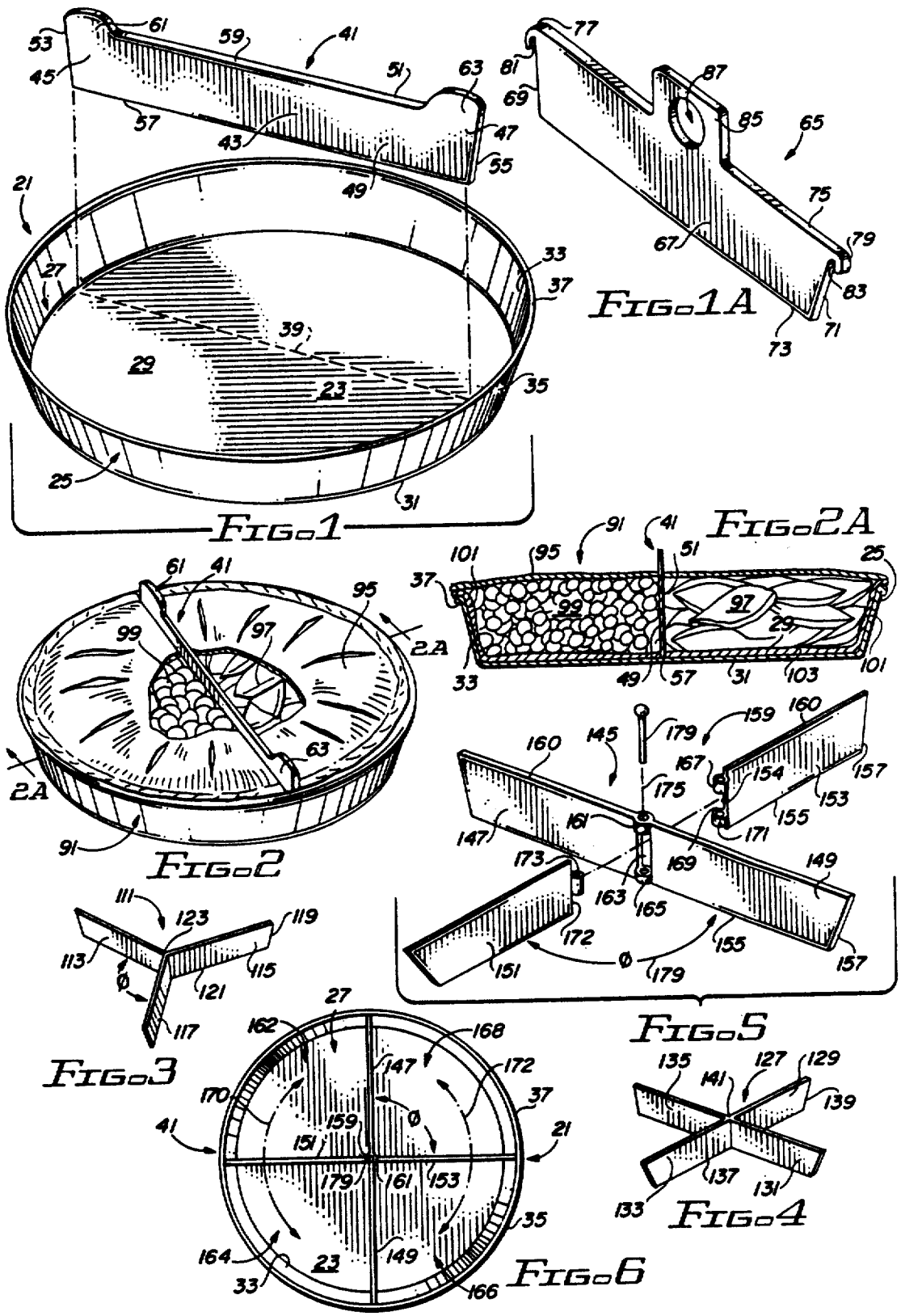

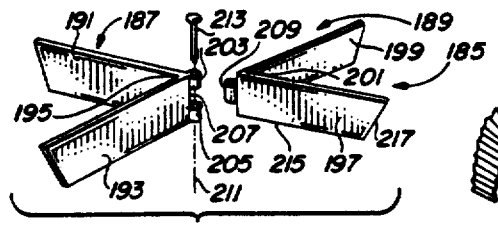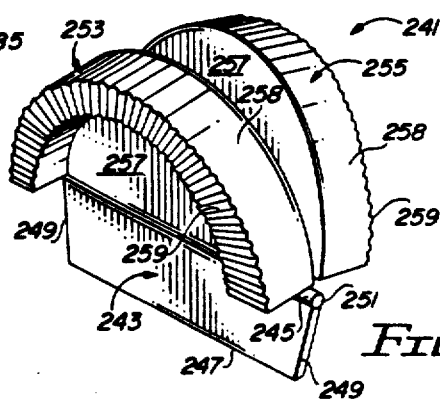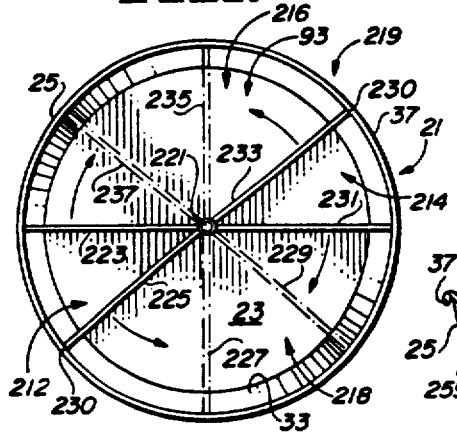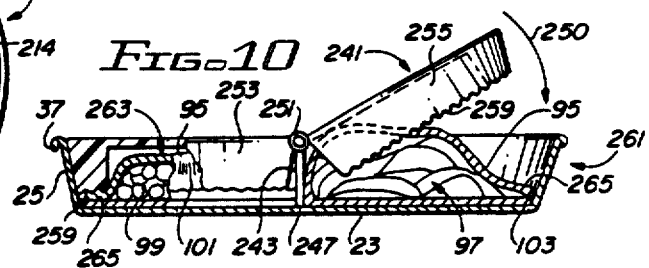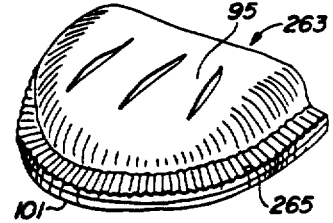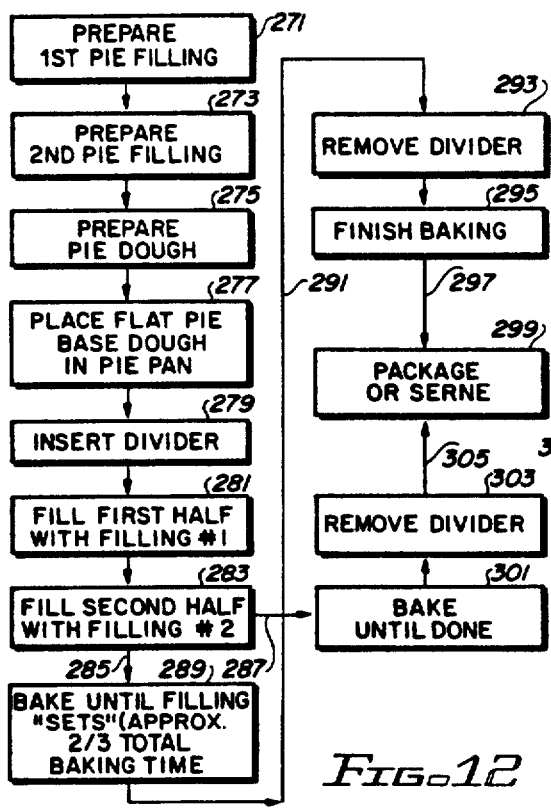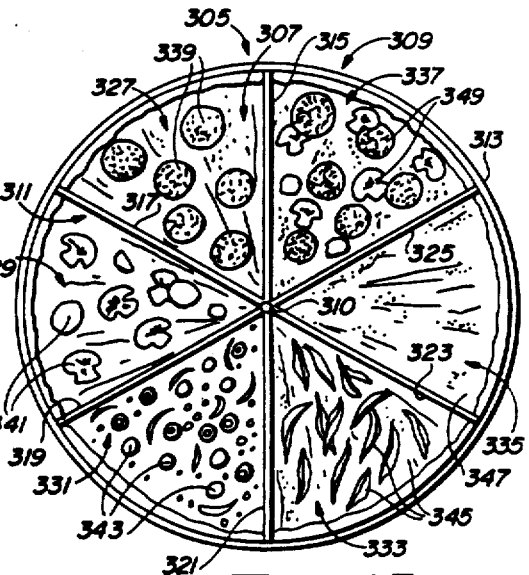

APPARATUS FOR MAKING A SPLIT PIE

BACKGROUND OF THE INVENTION

1. Field of the Invention

This invention relates generally to a method and apparatus for making pies, and more particularly, to a method and apparatus of making a split pie wherein separate sections of the pie contain different and distinct pie filling materials.

2. Description of the Prior Art

The public's infatuation with desserts and dessert products has constantly grown over the years, and will, by all reports, continue to do so in the future. Furthermore, the modern trend is exemplified by the fast food market which is constantly looking for new and easy-to-prepare products. Individual tastes are constantly changing. Large families are a rarity today, and family-type units of one, two or three members are predominant. Tastes within such families varies also so that it is often not worth baking or buying a whole pie having one single type of filling because it may not meet the taste demands of all of the various members of the family and part, perhaps most, of the pie may go to waste or get thrown out. It is totally unreasonable to bake or buy one, two or three pies having different fillings in order to meet the taste demands of each person in the family unit since this will normally supply far more pie than the family can eat and even more will be wasted and thrown down the garbage disposal. Because of such demands, methods for making frozen pies which are fully cooked, partially cooked and/or not baked at all before freezing are well-known. These pies are all found in the frozen food sections of the grocery store, and the like, for home consumption, either after baking is completed or after some degree of heating. The prior art does not teach making a frozen pie which is pre-divided into two or more halves, slices or sections, let alone a pie having different and distinct filling materials within the separate sections or divisions of the single unitary pie.

Also because of current trends, there has been a great increase in demand for the sale of relatively small, snack-size oblong pies which are generally lacking in taste, stale before eaten, and relatively expensive per portion. None of such pies are sold as a single pie having two or more separate and distinct pie fillings, and most are eaten cold unless they have been taken home and microwaved, or otherwise heated, which is the exception to the rule.

Typical of the prior art of baking pre-frozen pies, and representative thereof is U.S. Pat. No. 4,265,919, which issued on May 5, 1981 to Arnold M. Munter and David W. Ahlgren for a Process For Producing A Food Product. This patent teaches a process for producing a frozen, pre-prepared food product such as a pot pie, fruit pie, or the like. In order to practice the process, a specialized container is provided which has a centrally depressed receptacle and an outwardly and downwardly extending rim. The food filling is first deposited in the container receptacle. The container receptacle and rim are then covered with a sheet of unbaked pie dough so that the pie dough is shaped to conform to the container rim. The now-filled and covered container, which comprises the food product, is then frozen so that when a sufficient amount of heat is applied to the product, the filling heats to a fluid state. Thus, when the food product is inverted and the container removed, the filling flows outwardly to fill the upstanding crust formed by the baked dough. Various other patents teach methods for making pre-filled pies which are either partially baked, entirely baked, or not baked at all prior to freezing and packaging for sale in a grocery store, or the like.

None of the methods for making pre-frozen pies teach or even remotely consider dividing a pie into halves or sections before baking or dividing a pie into a plurality of sections each of which can contain a different and distinct pie filling material so that we still have the situation where an entire pie must be consumed, regardless of the taste preferences of the buyer and members of the family unit.

The prior art also teaches a wide range of devices which are similar to or referred to as "dividers", but which are used only to facilitate the removal of a pie from the pan once it is baked or its removal in sections each having the same identical pie filling. Examples of such devices are shown in U.S. Pat. No. 2,954,729 which issued on Oct. 4, 1960 to C. G. Suica for a Pie Shell Forming Device; U.S. Pat. No. 2,123,359 which issued on July 12, 1938 to E. O. Hallmark for a "Pie Pan"; and U.S. Pat. No. 2,327,988 which issued on Aug. 31, 1943 to Ethel Nell Bassett for a "Pie Pan". The first of these patents provides a bracket which lies on the bottom of the pie pan and whose only function is to operate to position a device for forming a fluted rim on the pie. The Hallmark Patent teaches a removable divider which is triangular in shape and filled with perforations to provide a pre-divided pie or a pie divided into slices, but the divider cannot be removed during cooking; is not removed for the purposes of providing separate and distinct filling materials in the various sections; cannot be removed until the pie is 100% baked; is hollow and filled with holes for the purpose of passing heat from one piece to another; and is difficult and messy to clean and maintain. The device actually appears to render it even more difficult to remove a slice of pie from the pie pan or container in which it is baked, and to remove the divider first would destroy the aesthetic appearance of the pie as it ripped through the top shell by the rather wide triangular base portion.

Lastly, the Bassett Patent teaches a divider having two separable pieces which are shaped to facilitate the removal of the pie from the pie pan. It is actually an improved two-piece pie pan construction and requires modification to the pie pan itself, as well as the other assemblies associated therewith. Its object is to provide a pie pan in which dividers may be employed so as to enable the division or pre-slicing of the pie into any desired number of segments or regulated sizes before the pie is baked. Again, it cannot be removed until after the pie is removed from the pan after baking, it is difficult to clean and maintain, it nowhere teaches or even remotely suggests putting different pie fillings in different sections; and, in fact, requires horizontal flange members on the bottom of the divider where the plane of the flange member is parallel to the inserted pie bottom and which would absolutely prevent removal from the assembly.

None of the patents of the prior art, including those specified above, teach or even remotely suggest any type of divider or separator which is adapted to be removed from the pie before it is completely baked or after it is baked and before it is sliced, and to try to do so would destroy or greatly mess up the pie as a unit and destroy its aesthetic appearance. Furthermore, none of these apparatus are designed to make a sectional pie capable of having different and distinct pie filling materials in the separate sections, portions or divisions thereof. Lastly, all are for home baking and none are suggested for use in making pre-frozen pies for the commercial market. Lastly, most are extremely complex and mechanically complicated and utilize a plurality or multitude of mechanical pieces and assemblies or modifications to the conventional circular pie pan itself, and are more difficult to clean, more difficult to maintain, etc.

The present invention provides a method and apparatus not found anywhere in the known prior art, but which solves many of the problems thereof, while avoiding the many problems associated therewith.

BRIEF SUMMARY OF THE INVENTION

It is an object of the present invention to provide a pie divider apparatus for dividing a pie into a plurality of separate and distinct sections each having a different and distinct pie filling material therein before the pie is baked and then removing the pie division apparatus when the pie filling is set or approximately ⅔ baked and then completing the baking of the pie.

It is another object of the above invention to provide a pie divider apparatus for separating a pie in half so that each half can contain a different and distinct pie filling material.

It is yet another object of the present invention to provide a pie divider apparatus for dividing a pie in half so that each half can contain a different and distinct pie filling before the pie is covered with dough and baked.

It is still another object of this invention to provide a pie divider apparatus having a plurality of pivotally connected vanes for dividing a pie into a plurality of equal or different-sized sections, wherein each section is adapted to have a different and distinct pie filling material placed therein before the pie is covered with an optional top layer of pie dough and baked.

It is yet another object of this invention to provide a pie divider apparatus having means for manually gripping same for removing the pie divider apparatus from the partially or completely baked pie without destroying the pie or its aesthetic appearance.

It is a further object of this invention to provide a pie making apparatus including a divider means for making small snack-size oblong pies divided into first and second halves each adapted to contain a different and distinct pie filling.

It is yet a further object of this invention to provide a baked pie having at least two separate sections each having a different and distinct pie filling.

It is still a further object of this invention to provide a multiple vane pie divider having a plurality of vanes each having a length approximately equal to the radius of the pie pan and means for pivotally connecting the veins at the center of the pan and manually positioning same for selectively making equal or unequal sized pieces.

It is another object of the present invention to provide a pie divider apparatus having a plurality of individual vanes each having a length substantially equal to the radius of the pie pan and wherein each of the vanes is rigidly attached to and integral with the others at its interior center proximate the center of the pie pan and the opposite ends are adapted to conform to the shape of the sides of the pie pan.

It is a further object of the present invention to provide a pie divider apparatus which includes a pair of V-shaped members pivotally connected at their vertices for dividing a pie into four sections each adapted to contain a different and distinct pie filling material, and wherein the pair of V-shaped sections are pivotally rotateable with respect to one another for forming at least one of four equal divisions and two equal divisions of one size and two equal divisions of another size.

Still another object of this invention is to provide a two-filling, split pie product by a process including the steps of providing a conventional circular pie pan, depositing a layer of pie dough on the circular bottom and sloping sides of the pie pan, inserting a pie divider appartus for separating the pie into two or more sections, filling each of the sections with a different and distinct pie filling material, pre-baking the pie until the pie filling materials are relatively set, or approximately for ⅔ of the normal baking time, removing the pie divider apparatus, and continuing to bake the pie until done.

It is yet a further object to provide such a process which may include the step of completely baking the pie before removing the divider apparatus.

It is still another object of this invention to provide the above-identified process wherein the fully baked pies are pre-frozen and packaged for sale.

It is yet a further object of this invention to provide a two-filling pie product made from the above process wherein the partially baked pies still containing the divider apparatus are pre-frozen and packaged for sale.

It is yet a further object of this invention to provide a method of making a baked pie having at least two sections each having a different and distinct pie filling.

It is still a further object of this invention to provide a baked pie having at least two sections, each having a different and distinct pie filling, and pre-freezing same before packaging and sale.

It is still a further object of this invention to provide a pie divider apparatus which can be sold or given away with the sale of pie-baking materials such as flour, pie filling mix, or the like, and sold to users for home baking purposes.

It is still a further object of this invention to package a conventional circular pie pan with a divider apparatus and package same for sale to the public for home use.

It is yet another object of the present invention to package the combination of a conventional circular pie pan, a pie divider apparatus of the present invention, and a lower layer of pie dough disposed in the pie pan before the divider is inserted so that the home user can add the necessary pie fillings to the various sections, cover the pie with a top layer of pie dough, if desired, and bake the pie until the filling sets, or until the pie is approximately ⅔ baked, before removing the divider and completing the baking of the pie.

It is yet another object of the present invention to provide a divider apparatus for a pizza for pre-dividing the pizza into a plurality of similarly dimensioned pieces or slices before it is baked and before the pizza topping is added such that each separate piece can have added thereto a different and distinct topping or combination of toppings without the toppings overflowing onto adjacent pieces.

It is still an object of the present invention to provide such a divider apparatus for a pizza wherein the dough is placed in the pie pan, the divider inserted therein, and the pizza partially baked before removal of the divider at which time the baking of the pizza may be finished or it may simply be frozen and packaged for sale where the buyer completes the cooking of the pizza or where the pizza is totally baked with the divider inserted, or completely baked after the divider has been removed, and the pizza is subsequently finished baking before freezing and/or packaging for sale to individual or group consumers.

It is still another object of this invention to provide a method of using a pie divider to pre-bake a pizza having a plurality of individual slices already formed therein and wherein each slice may be covered with a different and distinct topping without overflowing to the next adjacent piece.

It is yet another object of the present invention to provide a four-way adjustable pie divider apparatus comprising a first strip having a length approximately equal to the diameter of the pie pan and ends adapted to conformably abut the sides of the pie pan on a diameter thereof.

It is still another object of the present invention to provide such a four-way pie divider apparatus having a second strip at right angles or some other angles to the first strip for pre-dividing the pie for separate fillings before baking.

It is another object of the present invention to provide a four-way adjustable pie-divider apparatus including a first strip having a length approximately equal to the diameter of the pie pan and opposite ends conformed to abut the sides of the pie pan on diametrically opposite sides.

It is still another object to provide such a four-way adjustable divider which includes a pair of second and third vanes or strips each having a length approximately equal to the radius of the pie pan, having an exterior end shaped to conform to the sides of the pan and having an interior end pivotally connected to the mid-point of the first strip so that they can be pivotally moved to change the size of the four sections from equal to unequal, as desired.

It is a further object of the present invention to provide a pie divider apparatus for dividing a pie into a plurality of divisions by fixedly connecting a plurality of divider members at the center of the pie pan such that their opposite ends conform to the sides of the pan to form separate and discreet sections.

It is also an object of the present invention to make a preformed frozen pie product comprising the steps of placing a lower layer of pie dough in the bottom of a conventional circular pie pan, inserting a divider apparatus therein to separate the pie into a plurality of sections, filling each of the plurality of sections with a different and distinct pie filling material, baking the pie until the filling material is set or apprximately baked for ⅔ of its baking time and then removing the divider apparatus before the pie is frozen, packaged and sold.

It is still another object of the present invention to provide an improved method for making a frozen pie and the product produced thereby wherein the divider is removed from the partially baked pie and the pie is baked until done before freezing, packaging and sale.

It is still another object to provide such a method and product wherein the pie is 100% baked before the divider apparatus is removed and the pie is then frozen, packaged and sold.

It is yet another object to provide a pie which is at least partially baked for approximately ⅔ of the normal baking time, the pie divider apparatus removed, baking completed, and the pie frozen and packaged for sale.

It is yet another object of the present invention to provide a method for making relatively small snack-size oblong pies having two or more sections each adapted to contain a different and distinct pie filling material.

It is still a further object of this invention to provide an apparatus for producing such split-filling small pies.

It is still a further object of the present invention to provide a raw, unbaked pie with the divider still in it and then freeze, package and sell the pie for home baking and removal of the divider at the appropriate time.

It is still another object of this invention to provide a pie divider apparatus which can be sold to home bakers and used in conjunction with conventional circular pie pans for producing or baking a pie having two or more sections, each having a different and distinct pie filling material.

It is still another object to provide a pie divider - pie pan combination which can be packaged and sold for home bakers.

It is still another object of this invention to provide the combination of a pie pan, the divider assembly of the present invention, and a baked or unbaked crust already disposed in the pie pan with the divider inserted before being pre-frozen, packaged and sold.

It is another object to provide the combination of a conventional pie pan, the divider apparatus of the present invention, and a layer of cooked pie dough covering the bottom of the pie pan with the divider apparatus inserted, and then packaging and selling the combination either frozen or unfrozen for sale at grocery stores and the like.

The present invention also contemplates a method, apparatus, and product by process for making split filling, relatively small, snack-size oblong pies.

The present invention also contemplates a pie divider formed from two V-shaped sections connected at their vertices and pivotally positionable with respect to one another to divide the pie into four various sized pieces.

The present invention also contemplates a pie divider apparatus for producing pre-sliced pizza pies wherein each of the pieces may contain its own topping or combination of toppings without the toppings running or flowing over to adjacent pieces. This invention also contemplates making pizza pies which are adapted to be pre-frozen and sold, either baked or partially baked, utilizing the divider apparatus of the present invention.

Lastly, it is an object of the present invention to provide a pie divider apparatus for making a pie having two or more sections each adapted to contain its own different and distinct filling material such as fruits, custards, puddings, vegetables, nuts, mincemeat, meat potpies, vegetable potpies, combined meat and vegetable potpies, and mixed fruits, custards, puddings, nuts, mincemeat pies, and the like.

The present invention contemplates a product for making split pies, a process for making split pies, a split pie made from a particular process, and a pie divider apparatus for allowing a single pie crust to house two or more separate fillings. Typically, a conventional circular pie pan is provided and a lower layer of pie dough is placed over the bottom, sides, and perhaps the rim before the pie divider apparatus is inserted on top of, through or at least partially through the lower crust. The different and distinct pie fillings are then added to the separated sections and a top crust is placed thereover, if desired, and the pie is baked until the filling materials are sufficiently set or approximately for ⅔ of the normal baking time. The divider is preferably removed at this time and the pie returned to the oven for completing the baking process. If this is done at home, the pie may then be removed from the oven and eaten and if it is done commercially, the pie may be pre-frozen, and packaged for sale in a conventional grocery store or the like. In the preferred embodiment of this invention, the pies are typically divided in half or into two sections, although any number of sections can be produced depending on the number of blades, vanes, or separator members on the pie divider appartus.

In the preferred embodiment of the present invention, a conventional circular pie pan, often referred to as a deep-dish pie pan, has its bottom, sides, and preferably a portion about its rim covered with the bottom layer of pie dough. The pie divider is then inserted into or through the lower layer of pie dough to separate the pie pan into two equal and separate sections. The divider apparatus, in the preferred embodiment, comprises a relatively thin elongated strip of material having a length approximately equal to the diameter of the pie pan, a heighth sufficient to extend the divider slightly above the top crust, if any, and one or more ears adapted to be gripped for removing the divider from the pie at the appropriate time. Preferably, the divider strip is manufactured from a metal, preferably a heat-conducting metal such as aluminum, stainless steel, or the like, or, in the preferred embodiment, a heat resistent plastic material or even a material such as heat-resistent glass, such as sold under the trademark Pyrex, a ceramic material, or the like can be used.

In one embodiment, the pair of ears are located at the distal ends on the top edge of the strip and extend a predetermined distance above the mid-portion of the strip for gripping purposes. In an alternate embodiment, a central ear having an aperture therein is provided for gripping and lifting purposes and a pair of downwardly turned hook-like members may be provided on opposite distal ends of the top edge of the device for reaching about the diametrically opposed sides of the rim of the pan to substantially secure or lock the device in position.

The present invention also contemplates many variations of the pie divider apparatus of the present invention, both in fixed form and by pivotal attachment at the approximate center of the pie pan to allow the strips to be manually movable or adjustably positioned for producing any number and any size of desired pie sections each having its own separate and distinct pie filling material.

The pie can contain any combination of separate and distinct pie filling materials such as fruits, custards, puddings, vegetables, meats, and the like. Although, in the preferred embodiment, it is desired that the two different and distinct pie filling materials used have similar baking times so that they are both gelled or set at approximately the same time in the baking cycle.

The present invention also contemplates a method for making a split pie comprising the steps of providing a conventional pie pan having a circular bottom, a pair of outwardly tapered sides, and a rim; adding a layer of pie dough to cover the circular bottom, outwardly tapered sides, and a portion of the rim, if desired; inserting the divider strip of the present invention across a diameter of the pie pan such that its bottom edge either cuts into or through the bottom layer of pie dough, conforms to the shape of the outwardly tapered sides and completely separates the two halves of the pan to separate sections; a different and distinct pie filling material is then added to each of the sections and, if desired, an upper crust is placed over the unit and pressed down over the top of the strip so that the strip protrudes through the unbaked dough or, the top layer is placed on in two semicircular halves so that the divider is not covered by the top layer; and the pie is baked until the filling material gels or sets sufficiently to remove the divider which normally occurs at approximately ⅔ of the baking time in the normal baking cycle. The divider is removed by gripping one or more of the tab members and quickly and easily withdrawing it from the pie and the pie fillings will not greatly intermix with one another since they are preferably set or gelled at this time so that the amount of mixture across the division is minimal. After the divider is removed, the pie is baked to completion, removed from the shell and eaten.

Another method contemplates the use of the divider for making pre-frozen pies adapted to be sold in grocery stores and the like wherein (1) the divider may be removed and the pie baked to completion before it is frozen, packaged and sold; (2) a pie is baked a sufficient time for gelling or setting to take place, the divider is removed, and the pie is pre-frozen at that time, packaged and sold so the home user continues to bake the pie for the remaining baking cycle before serving it, and (3) lastly, the raw unbaked pie may be frozen, packaged and sold raw with the divider still in it, in which case the baker at home bakes it in accordance with the instructions previously given.

Both fixed, multiple strip dividers and pivotally adjustable strip dividers are contemplated for dividing the pie into three, four, five, six, seven, . . . 'n' pieces, as desired, although under normal circumstances, it would seldom be used for dividing the pie into more than four pieces.

The divider apparatus of the present invention may also be used in a method for making relatively small snack-type oblong pies; pot pies and the like; and pizza pies. The device for pizza pies would normally be a device having sufficient strips for dividing the pizza into six or eight even pieces although a variable unit could also be used to divide it into different sized slices, as desired, and different and distinct toppings or combinations of toppings could be placed on either slice. The pie dough would be laid into the pie pan as conventionally done and the divider apparatus would then be inserted through the crust to provide the pre-sliced separate sections on to which the various toppings would be placed before baking. The apparatus could be removed at some portion of the baking cycle or, at the end of the cycle so as to function to both pre-slice and ensure that the various toppings do not spill over onto adjacent pieces.

It will also be understood, that while the preferred embodiment is discussed with reference to dividing a pie into two equal and separate halves, each containing its own separate and distinct pie filling, that any number of divisions can be made by the teachings of the present invention using either fixed blade or pivotal blade pie divider units. Still further, it will be understood that the divider apparatus is claimed as a separate unit, in combination with a conventional circular pie pan, in combination with a conventional circular pie pan having a layer of either baked or unbaked dough in the bottom thereof; in a frozen or partially baked pie, in a pot pie, in a pizza, in combination with any of the above, and applicant further claims a product made by the process using the divider of the present invention and a method of making the above products using the divider of the present invention.

These and other objects and advantages of the present invention will be more clearly understood after reading the Detailed Description of the Preferred Embodiment of the Present Invention, the Claims, and the Drawings, which are briefly described hereinbelow:

BRIEF DESCRIPTION OF THE DRAWINGS

FIG. 1 shows a perspective view of a conventional pie pan employing the pie divider apparatus of the preferred embodiment of the present invention;

FIG. 1A illustrates an alternate embodiment of the pie divider apparatus of FIG. 1;

FIG. 2 is a perspective view, partially broken away, of a partially or fully baked pie having the pie divider apparatus of the present invention still inserted within the pie pan wherein the pie divider apparatus divides the pie into two halves each comprising a separate and distinct section and each having a separate and distinct pie filling therein;

FIG. 2A shows a sectional side view of the pie combination of FIG. 2;

FIG. 3 illustrates a rigid three-way pie divider apparatus of an alternative embodiment of the present invention;

FIG. 4 is a perspective view of a rigid four-way pie divider apparatus for yet another embodiment of this invention;

FIG. 5 is a perspective view, as it is assembled, showing a four-way pivotal divider of yet another embodiment of the present invention;

FIG. 6 shows a top plan view of a conventional circular pie pan having the four-way pivotal divider of FIG. 5 installed therein;

FIG. 7 is yet another embodiment of a pivotal divider apparatus of the present invention;

FIG. 8 illustrates a top plan view of a conventional pie pan including the divider of FIG. 6 and its various adjustable positions;

FIG. 9 illustrates a combination divider and shaping apparatus used for making relatively small snack-size oblong pies;

FIG. 10 illustrates the apparatus of FIG. 8 as it is used to make such an oblong pie;

FIG. 11 represents a perspective view of a portion of an oblong pie made by the apparatus of FIGS. 9 and 10;

FIG. 12 illustrates a method of making a split pie of the preferred embodiment of the present invention and the product produced thereby; and FIG. 13 illustrates the divider apparatus of the present invention used to separate slices in a pizza pie.

DESCRIPTION OF THE PREFERRED EMBODIMENTS

FIG. 1 illustrates a perspective view of a conventional circular pie pan 21 having a conventional circular pie pan bottom 23, upwardly disposed and outwardly oriented tapered pie pan sides 25 defining a hollow interior 27 therein. The pie pan 21 includes an interior bottom surface 29, an exterior bottom surface 31, an interior side surface 33, an exterior side surface 35, and an upper rim or lip portion 37. The diameter of the circular bottom 23 is represented by the reference numeral 39 and the divider assembly 41 of the present invention is shown as including an elongated, generally rectangular, relatively thin body portion or strip 43 having a first end portion 45 and a second or opposite end portion 47. The longitudinal length of the strip 43 includes a first divider side surface 49 and second or opposite divider side surface 51. Furthermore, the distal edge or side 53 of the end portion 45 and the distal end 55 of the opposite end portion 47 are tapered vertically upwardly and radially outwardly from the center of the pan and the divider so as to dimensionally conform to the slope of the interior surface 33 of the pie pan sides 25 so that when the divider apparatus 41 is inserted within the hollow interior 27 of the conventional pie pan 21 it forms a relatively complete seal to separate two equal halves of the pie pan 21 and form two separate and distinct sections or portions of the pan, each adapted to contain a separate and distinct pie filling material therein. The body portion 43 of the divider assembly 41 is relatively straight and perpendicular to the plane of the bottom 29 and it includes a bottom edge portion 57 which may be sharp, if desired. However, the top edge 59 of the body portion 43, in the embodiment of FIG. 1, has a first ear member 61 operatively disposed at the first end portion and a second oppositely disposed ear member or upraised portion 63 operatively disposed at the second or opposite end portion 47 such that both the ear members, extensions, or gripping portions 61 and 63 extend vertically above the level of the top edge 59 of the body portion 43, and are used for manually gripping or grasping the divider apparatus 41 for removing it from the pie pan 21 at the appropriate time, as hereinafter described.

FIG. 1A shows a perspective view of an alternative embodiment to the divider assembly 41 of FIG. 1. In FIG. 1A, the divider assembly 65 is shown as including an elongated, relatively thin, longitudinal body portion 67 having a first edge or end 69 and a second opposite edge or end portion 71, each of which is adapted to dimensionally conform to the sloped interior 33 of the pie pan sides 25, as previously described. The elongated body 67 also includes a bottom edge 73, which may or may not be sharpened or tapered for ease of penetrating the bottom layer of dough, as hereinafter described, and a top edge portion 75. Again, the top edge portion 75 is generally parallel to the bottom edge portion 73 and, when disposed in the pie pan, both are generally paralled to the plane of the pie pan bottom 23. A first downwardly extending hook-like member or element 77 is operatively disposed distending from the top edge 75 past the distal end 69 of the body 67 while a second oppositely disposed, downwardly distending, hook-like member or element 79 extends from the opposite end of the body 67 from the top edge 75 down over and separated or spaced apart from the distal end 71. The hollow channel or bite 81 of the first hook-like member 77 and the hollow recess area or bite 83 of the second hook-like member 79 are adapted to pass over diametrically opposed portions of the rim 37 of the pie pan 21 for locking or securing the pie divider apparatus 65 in its inserted position within the pie pan 21. A central tab member or ear member 85 is operably disposed in the center of the top edge 75 of the body portion 67 and extends vertically upward therefrom. This tab member or ear 85 may include a central aperture 87 so that either the ear member 85 may be manually gripped for removing the divider 65 from the pie pan 21 or an implement of some sort may be inserted into the aperture 87 and used to lift up and remove the divider apparatus 65 from the hot pie, as hereinafter described.

FIG. 2 shows a perspective view, partially broken away, of a conventional pie pan having the divider apparatus 41 of FIG. 1 inserted therein to form a split-filling pie 91. The pie 91 is shown as having an upper pie crust or top layer 95, a first fruit filling or filling material 97, such as apples or the like, a second different and distinct fruit filling or second different and distinct pie filling material 99, such as cherries or the like, each of which are disposed in opposite halves or sections of the pie. The pie 91 represents the product made by the process of the present invention, as later described, and represents the preferred embodiment of the two-sectioned pie or split-filling pie, with each section having a different and distinct pie filling material disposed therein, and which is produced by the pie divider apparatus of the present invention.

FIG. 2A shows a sectional side view of the pie 91 of FIG. 2. In FIG. 2A, it can be seen that a bottom pie crust 103 overlays the upper or interior surface 29 of the flat circular bottom 23 of the pie pan 21 of FIG. 1, and extends as a layer of pie dough or crust 101 up the interior surface 33 of the sides 25 of the pie pan 21 and ends slightly above the rim or lip portion 37, as previously described. It can be seen that the hollow interior of the pie pan to the left of the divider apparatus 41 and adjacent the divider side 49 is filled with a first pie filling material 99 such as a fruit, for example bluberries or cherries or the like, while the hollow interior portion of the opposite side or section of the pie facing the side 51 of the divider 41 is filled with a second separate and distinct pie filling material 97 such as apples, peaches, or the like. It will be observed that the divider apparatus was inserted into the hollow interior of the pie pan 21 so that the bottom edge portion 57 penetrated the lower bottom layer of pie dough 103 and abuts against the interior surface 29 of the pie pan bottom 23, and it extends to close off the diametrically opposed opposite sides, as shown in FIG. 2, so as to completely divide or section the pie into two separate and distinct pie halves, each having a separate and distinct pie filling material contained therein. It will then be noted that an optional top or upper layer 95 of pie dough was added after the filling material 97 and 99 were added, either by adding two separate half pieces of pie dough in a semicircular shape which are disposed on either sides of the divider 41 or as a single piece of pie dough and simply pushed down over the top edge 59 of the divider 41 so that the top of the divider protrudes through the upper pie crust 95 for ease of removal of the divider 41 when such is desired.

FIG. 3 is a perspective view of a three-way, rigidly-constructed pie divider apparatus which is an alternative to the two-way dividers of FIGS. 1 and 1A. The rigid three-way pie pan divider 111 is shown as having a first blade, vane or strip or generally rectangular member 103, a second vane 115 and a third vane 117. The exterior ends 119 of the individual vanes 113, 115 and 117 are each dimensioned to conform to the shape of the sides 33 of the pie pan 21, as previously described, while the opposite interior ends of the vanes 113, 115 and 117 are rigidly connected or integral with one another at the central portion 123 which is operatively disposed at the center of the bottom 23 of the pan 21 once inserted. Each of the vanes 113, 115, 117 also include a bottom edge 121 which may or may not be tapered or sharpened, as desired, and a central junction 123 where they are joined, attached or integrally formed with one another. The three-way pie divider 111 of FIG. 3 is formed such that the angle between adjacent blades is approximately 120 degrees to form three separate and equally-dimensioned pie slices or sections although it will be understood by those in the art that the angles could be varied to produce three slices wherein two or more have the same or different dimensions.

FIG. 4 illustrates a rigid four-way pie divider apparatus 127 which includes a plurality of blades, vanes, or strips 129, 131, 139, 133, and 144. Each of these strips has a bottom edge 137 which may be tapered or sharpened, as desired, ends shaped to conform to the inside side surface 33 of the pan 21, and a central junction 141 at their opposite ends where they are joined or attached to each other or integrally formed with each other. It will be noted that the rigid four-way divider of FIG. 4 divides a pie into four portions, two of which are equal to one another and dimensioned differently from a second two which are equally dimensioned to each other but not to the first two portions. If the angle between the blades was set at 90 degrees, the device would produce four equally-dimensioned pieces, and by selectively varying the angle, during manufacturing, pairs of different sized sections, portions, or pieces can be produced, if desired. In the most common embodiment, however, four equal sections would be produced with each section containing a separate different and distinct pie filling material.

FIG. 5 illustrates a four-way, selectively-positionable, pie divider 145 having a first blade or vane 147, a second blade or vane 149, a third blade or vane 151, and a fourth blade or vane 153. Each of the blades or vanes has a bottom edge 155, which is preferably tapered or sharpened, a top edge 160, and an exterior end 157 which is shaped or dimensioned to conform to the shape or slope of the interior surface 33 of the side 25 of the pie pan 21 as previously described. Each of the blades 147, 149, 151 and 153 are adapted to be pivotally connected or joined at a central portion 159, as hereinafter described. The first blade 147 and the second blade 149 are integrally joined at their center portion by a first or top eyelet-forming member 161 having a vertically oriented central aperture therethrough, and a second or bottom eyelet-forming member 165 having a second vertically aligned eyelet or aperture 167 formed therethrough. The upper and lower eyelet-forming elements 161 and 165 are separated by a space or gap 163.

The third blade or vane 153 also has an interior distal end 154, a top edge 160 and a bottom edge 155. The interior distal end 154 includes a third eyelet-forming element 167 having a vertically aligned eyelet or aperture passing therethrough, and it is disposed a predetermined distance down the end 154 and spaced apart from the top edge 156. Similarly, a second or lower eyelet-forming element 171, also having a vertically aligned central aperture, is disposed on the distal end 154 of the blade 153 and positioned a predetermined distance up from the bottom edge 155 such that there is still a narrow gap 169 between the upper and lower eyelet-forming elements 167 and 171, respectively.

The fourth and last blade 151 also has an upper edge 160, a lower edge 155 and a distal interior end 172. A single eyelet-forming element 173 is operatively disposed centrally on the distal interior end 172 and includes a vertically oriented aperture or bore therethrough.

The single eyelet-forming element 173 is adapted to fit snuggly in the gap 169 between the eyelet-forming elements 167 and 171 of the third blade 153, while the combination thereof is adapted to fit in the hollow space or gap 163 between the upper and lower eyelet-forming elements 161 and 165 connecting the first and second blades 147 and 149 together. Therefore, when assembled, all five of the vertically aligned apertures of the eyelet-forming members 161, 167, 173, 171, and 165 are vertically aligned such that a single pin member or pivot pin 179 can be inserted therein and through the hollow central vertically aligned apertures along vertical axis 175 thereof such that at least the two vane members 151 and 153 can be selectively, pivotally moved or adjustably positioned to change the angles therebetween. While the first and second blades 147 and 149 are rigidly interconnected to act as a single blade, the combined length of the first and second blades 147, 149 is approximately equal to the diameter of the pie pan while the heighth is slightly greater than the level of the pan which is disposed above the upper crust, when such is used. Instead of making the blades 147 and 149 as a single integral unit, they too could have been pivotally connected so that all four blades could be moved for all types of angle changes. However, in the embodiment of FIG. 5, the blade members 151 and 153, each having a length approximately equal to the radius of the pie pan 21, can be adjustably positioned so as to produce a two-way division when each is folded back parallel to and in abutment to the opposite sides of the blades 147 and 149; a three-way division wherein one remains folded back and one is folded out; and a four-way division with either equal or unequal pie sections, depending on the angle set between the blade 151 and the combined, rigidly connected, coplanar blades 147 and 149, and between the blade 153 and the combined, rigidly connected, coplanar blades 147 and 149.

FIG. 6 illustrates a top plan view of a conventional pie pan 21 having the divider apparatus 145 of FIG. 5 inserted therein and the blades 151, 153 manually-positioned for dividing the pie into four equal sections; i.e. positionable or rotatable vanes 151 and 153 form 90 degree angles with the common plane of vanes 147, 149, thereby forming a right angle "θ" therebetween, designated as separate and distinct pie portions, sections or divisions, 162, 164, 166, and 168, each of which is adapted to receive a different and distinct pie filling material therein for making a four-way split pie. The dimensions of each pie section 162, 164, 166 and 168 can be selectively varied by selectively positioning vanes 151 and 153 with respect to the vanes 147 and 149 as represented by the directional arrows 170 and 172, respectfully.

FIG. 7 illustrates yet another adjustable or pivotally connected pie divider apparatus 185 which includes a first V-shaped or wedge-shaped portion 187 and a second V-shaped or wedge-shaped portion 189. The first V-shaped portion 187 includes a first vane or blade 191 and a second blade or vane 193 which are disposed at an acute angle to one another and integrally formed, attached or joined at a vertex 195 which, when inserted in the pie pan 21, is disposed proximate the center of the bottom 23 of the pie pan 21, as previously described. Similarly, the second V-shaped portion 189 includes a first vane or blade 197 and a second vane or blade 199 which have their interior ends integrally joined or coupled at a vertex 201.

The first vertex 195 of the first V-shaped section or portion 187 includes an upper eyelet-forming element 203 having a vertically aligned aperture therethrough, as represented by the vertical axis 211. The opposite or lower side of the vertex 195 of the first V-shaped element 191 also includes a second eyelet-forming element or means 205 having a vertically aligned aperture therethrough. The exterior of the vertex 201 includes a central eyelet-forming member 209 dimensioned to fit in the gap 207 between the upper and lower eyelet-forming members 203 and 205 such that vertically aligned apertures of the upper eyelet 203, the central eyelet 207 and the lower eyelet 205 are coincident with the vertical axis 211, are separated by a gap 207, and are adapted to receive a pivot pin 213 therein and therethrough for securing the two V-shaped portions 187 and 189 pivotally together such that the angles between them can be manually-adjustable or selectively determined while the angles within the individual V-shaped members 185, 187 cannot be changed. As previously described, each of the vanes 191, 193, 199, and 197 has a lower or bottom edge 215 which may be tapered or sharpened an outer distal end 217, and an upper edge 216 which is generally parallel to the lower edge and the surface of the bottom 23 of the pie pan 21 such that the plane of the vanes 191, 193, 197 and 199 are perpendicular to the plane of the bottom 23 of the pie pan 21. Preferably, some type of ear or tab member would be disposed on the top edge 216 of at least one of the vanes 191, 193, 197 and 199 to enable it to be easily lifted out of the pie and pan, as previously described, although none is shown in FIG. 7 as it being merely repetitious of that previously shown.

FIG. 8 shows a top plan view of a conventional pie pan 21 having the apparatus of FIG. 7 disposed therein, and illustrates the pivotal movement of the two V-shaped divider sections to produce various sized sections, portions or pieces. It can also be used to illustrate a plurality of centrally, pivotally attached vanes, blades, strips or members for dividing a pie into any number of sections, as desired. In that respect, both the phantom lines and the solid lines can be thought of as each being an actual vane such that the divider apparatus 219 of FIG. 8 includes a plurality of centrally, pivotally connected vanes 223, 225, 227, 229, 231, 233, 235, and 237 each having their outer distal edges 230 dimensioned to conform to the inside surface 33 of the sides 25 of the pie pan 21 and each being pivotally attached to one another at the center 221 by pivot means, as described previously herein. Alternatively, the first V-shaped element 187 can be thought of as including vanes 223 and 225 while the opposite V-shaped element 189 is shown as including vanes 223 and 231 so as to produce two relatively small sections 212, 214 and two relatively large sections 216, 218 each adapted to contain a different and distinct pie filling material.

FIG. 8 also shows that the entire pie divider apparatus 185 of FIG. 7 can be shifted or moved to the position of the phantom lines, as indicated by motion direction arrows 220, 222, 224 and 226, such that the vanes 235 and 237 represent the vanes 191 and 193 of FIG. 7 while the vanes 227 and 229 represent the vanes 197 and 199 of FIG. 7 having been shifted approximately 90 degrees, but still producing two relatively small and two relatively large pie sections each adapted to contain a different and distinct pie filling material.

FIG. 9 illustrates an apparatus 241 for making a split pie of the relatively small, snack-size, oblong pie variety. The apparatus 241 of FIG. 9 is shown as including a single blade divider element 243 having a top edge 245 substantially parallel to a bottom edge 247 which may be tapered or sharpened as previously described. The opposite end edges or sides 249 may be tapered or straight depending upon the form of the sides of the basic pan in which the oblong pies are baked. A pivot rod or member 251 extends through an eyelet formed or disposed on the top edge 245 of the divider 243 and is used to pivotally interconnect it to first and second C-shaped crimper jaw members 253 and 255, respectively. Each of the jaw members 253 and 255 include a relatively flat, semi-ovular, top portion 257, and a downwardly distending C-shaped jaw portion 258 which terminates in a plurality of teeth-like members or serrations 259 for producing a crimping edge.

FIG. 10 shows the apparatus 241 of FIG. 9 in the use position and illustrates a pie pan 261 containing a pie 263 having a pie crust edge 265. The pie crust edge 265 is crimped about its entire peripheral edge by the teeth-like portions 259 at the base of the jaws 253 and 255, respectively. It will be seen that the bottom layer 103 of pie dough is placed into the pan 261 and then the apparatus 241 of FIG. 9 is inserted so that the divider portion 243 separates the pie pan 261 into two equal half sections completely separated from one another. The pie filling materials 97, 99 are then added to each half section and a top layer 95 of pie dough is added before the jaws 258, 259 are shut to completely seal the pie around its crimped edges 265 and enable separate and distinct pie fillings 97, 99 to be baked into each of the half sections thereof, as previously described with respect to baking in conventional pie pans.

FIG. 11 illustrates the snack size oblong pie product 263 of the present invention and is shown as having a top pie crust 95, a bottom crust 101, and a crimped or sealed edge portion 265 produced by the apparatus of FIGS. 9 and 10.

FIG. 12 illustrates both a method of making a split pie having a different and distinct filling material in each separate half, and a product made from the given process and using the divider of the present invention. In FIG. 12, block 271 illustrates that a first pie filling is prepared while block 273 illustrates that a second different and distinct pie filling material is prepared. Block 275 then illustrates that the pie dough is prepared while block 277 illustrates that a lower layer of pie dough is placed on the flat bottom surface, side surfaces and partially the rim area of a conventional pie pan. Block 279 represents the step of inserting or placing the pie divider apparatus of the present invention into the hollow interior of the pie such that the lower edges pass into or through the bottom layer of dough and divide the hollow interior of the pie shell into two separate and distinct halves. Block 281 represents the step of filling one of the halves with the first prepared pie filling of block 271 while block 283 represents the step of filling the second separate and distinct half of the pie shell with the filling prepared in the step of block 273. The pie may or may not be covered, as desired, and it is then placed in an oven and baked until both of the pie filling materials set or gel, which occurs at approximately ⅔ of the total baking time, for most pies. Experimentation can be used to determine the exact amount of baking time required to optimize the time at which the pie divider apparatus can be removed. Block 293 represents the step of then removing the divider apparatus from the pie while block 295 illustrates completing the baking of the pie until it is done. The pie may be taken out of the pan and eaten, if made at home, at this time but in the preferred commercial embodiment, the pie is then packaged or served as indicated by block 299 or even pre-frozen, packaged and sold, as desired. An alternate embodiment shows, in blocks 301 and 303, that after the second half of the pie is filled in block 283 with the second different and distinct pie filling material of block 273, the pie is completely baked until it is done as indicated by block 301, and then, as indicated by block 303, the divider is moved after the pie is completely baked and prior to packaging or serving.

FIG. 13 illustrates a pie divider apparatus 311 of the present invention in an alternate form for use in making presliced and divided pizza pies. FIG. 13 illustrates a pizza and divider combination 305 containing a pizza pie 307 disposed in a conventional pizza pan 309 and including a divider apparatus 311. A central junction 310 is disposed proximate the center of the pan, and the pan 309 includes a pizza pan side 313 surrounding a pan interior. The divider apparatus 305 includes a plurality of blades, vanes or divider members 315, 317, 319, 321, 323, and 325. While any number may be used, the present number divides the pizza pie into six equal and distinct portions and allows a different and distinct topping or combination of toppings to be placed onto each separated section or slice before the pizza is baked so as to ensure that the various pizza toppings do not overflow or run onto adjacent slices. In other words, if six different people wanted six different toppings, it could be produced with the apparatus of FIG. 13. For example, FIG. 13 shows the individual slices or sections 327, 329, 331, 333, 335 and 337 containing, for example, pepperoni topping 339, mushrooms 341, black olives and chopped onions 343, anchovies and green peppers 345, double cheese 347, and mushrooms and sausage or pepperoni 349, respectively. The various blades of the divider apparatus 311 prevent the various toppings or combinations of toppings from overflowing onto adjacent slices since the heighth of the divider elements is greater than the heighth of the pizza slices with or plus topping(s), and if the bottom edge portions of the vanes are sharpened, the pie is automatically divided or sliced when the divider apparatus is inserted and it can be removed either when the pizza is partially done or completely done, as desired, and before it is served or pre-frozen and packaged for sale. In this manner, a multiplicity of different and distinct toppings can be provided on different slices of the same pizza pie without overlap and while simultaneously slicing or pre-slicing the pizza to avoid the later difficulty in doing same.

The present invention contemplates a split pie product having at least two different and distinct separate pie fillings made by the process of the present invention as well as a novel relatively small snack size oblong pie made from the method and the apparatus of the present invention. Both are unique products made from the processes of the present invention and will be claimed as such.

The present invention also contemplates a method of making the split pie and various embodiments thereof both for home use and for commercial use and for selling frozen or non-frozen split pies.

Furthermore, the present invention contemplates the apparatus of the present invention for preparing a split pie having two equal and opposite halves or a divider which may be pivotally adjustable or rigidly fixed for producing two or more separate sections in a pie, as desired by the user.

Still further, the present invention contemplates the use of the divider apparatus of the present invention with various pie filling materials such as fruits, custards, puddings, vegetables, meats, vegetable potpies, meat potpies, combination vegetable and meat potpies, and split pies having different and distinct mixtures of materials such as two different kinds of pudding, two different kinds of fruit, etc.

Still further, the present invention is directed to the combination of the pie divider apparatus of the present invention combined with either a conventional circular pie pan or the type of pie pan used to make oblong snack size pies. Still further, it contemplates the use of the pie divider apparatus of the present invention used to make pre-frozen pies; the combination of a conventional pie pan including a lower layer of baked or unbaked pie dough and including the pie divider apparatus of the present invention sold for home use requiring filling of the separate sections with different filling materials, adding a top crust, if desired, and baking the pie either partially or fully and removing the divider apparatus as previously described.

Yet further, this invention contemplates the combination of pie baking materials such as flour, pie filling mix, puddings, and the like in which the pie divider apparatus of the present invention may be sold or given away to enable the baker to make the split pies of the present invention and the product by process, product, method, and apparatus of utilizing the split pie concept for pre-frozen pies, either partially baked, fully baked, or unbaked; either including or without the pie divider apparatus of the present invention still in place; and to be sold fresh or pre-frozen, or the like.

In the preferred embodiment of the present invention, the conventional pie pan may be a conventional aluminum pan although other types of pie pans or deep-dish pie pans such as heat-resistant plastics or ceramic, glass such as Pyrex or Corningwear, etc. may be used. Similarly, in the preferred embodiment of the present invention, the divider strips or vanes may be made from a conventional heat-conducting metal such as aluminum, stainless steel, or the like, although preferably a relatively thin, injection-molded or stamped piece of heat-resistant plastic material would be used, but it will be understood that any type of heat-resistant material such as heat-resistant glass, ceramic, plastic, or the like could also be used in the present invention.

It will also be understood that either rigid pie dividers having a single blade, or multiple blades for dividing the pie into any plurality of different and distinct separate sections, either of equal dimension or unequal dimension, is contemplated by the prior art as well as the use of pivotally adjustable multiple-blade dividers for dividing the pie into any number and size of separate sections, each adapted to house or contain a separate and distinct pie filling material.

Lastly, other possible uses in pie-type products, such as frozen casseroles having macaroni and cheese on one side and scalloped potatoes on the other; or any such obvious application for dividing a normally single, unitary pie-like member into two or more sections each having a separate and distinct fillings is contemplated within the scope of the present invention.

It will be understood by all those skilled in the art that various modifications, changes, adaptations, variations, substitutions, alterations, and the like, can be made in the structure, composition, materials, uses, and combinations of the present invention, in any of product by process, method, and apparatus, without departing from the spirit and scope of the present invention which is limited only by the appended claims.

I claim:

1. A pie-making apparatus for use in a pie pan including a generally flat circular bottom having a first diameter, an annular pie pan side having a bottom edge integral with the outer peripheral circumference of said flat circular bottom and a top pie pan rim spaced a predetermined distance above the plane of said flat circular bottom, said pie pan side being disposed upwardly from the plane of said flat circular bottom and radially outward from the center of said flat circular bottom such that the diameter of said pie pan rim is greater than the diameter of said flat circular bottom, a plane substantially parallel to the plane of said flat circular bottom passing through said pie pan rim for defining an open circular pie pan top and the space between said bottom, said top, and said side defining a pie pan interior adapted to receive a bottom layer of pie dough therein for substantially covering said bottom, said side, and at least a portion of said rim, said pie pan interior and said bottom layer of pie dough being adapted to receive a pie filling material therein and thereon, respectively, and said pie filling material being adapted to receive a second top layer of pie dough thereover, if desired, to form a complete pie ready for baking, said apparatus comprising:

pie divider means adapted to be inserted within said pie pan interior after said bottom layer of pie dough is added but before said pie filling material and said top layer of pie dough are added for dividing said pie into a plurality of different and distinct pie sections;

each of said different and distinct pie sections being adapted to receive a different and distinct pie filling material therein, and each of said different and distinct pie filling materials having a substantially equal baking time, and a different and distinct one of said pie filling materials being added to each of said plurality of different and distinct pie sections before said top layer of pie dough is placed thereover, said pie divider means including a first elongated strip having a length substantially equal to the diameter of said circular pie pan, said first elongated strip having two substantially, equally dimensioned end portions and a hollow mid-portion therebetween, said mid-portion including upper and lower eyelet-forming means integral with and joining said two portions together such that the hollow interior of said upper and lower eyelet-forming means are vertically aligned with each other and spaced a predetermined distance apart, a second separator strip member having a length approximately equal to the radius of said pie pan, an outer distal end adapted to abutedly conform to the shape of the side of said pie pan and a pair of upper and lower eyelet-forming means operatively disposed on the interior opposite end thereof, a third separate strip member having a length approximately equal to the radius of said pie pan, an outer distal end adapted to abutedly conform to the shape of the side of said pie pan and a single eyelet-forming means operatively disposed at the mid-portion of the opposite interior end thereof;

said single eyelet-forming means of said third separator strip member being adapted to be operatively disposed in the gap between the upper and lower eyelet-forming means on the interior distal end of said second separator strip and the combination thereof being adapted to fit in the gap between the upper and lower eyelet-forming means at the mid-portion of said first elongated strip such that the apertures through the eyelet-forming means are all coaxially vertically aligned with one another, and pivot pin means adapted to be inserted through the hollow apertures of said vertically aligned eyelet-forming means for enabling said second and third separator strips to be selectively positioned with respect to the plane of said first elongated strip.

2. A pie-making apparatus for use in a pie pan including a generally flat circular bottom having a first diameter, an annular pie pan side having a bottom edge integral with the outer peripheral circumference of said flat circular bottom and a top pie pan rim spaced a predetermined distance above the plane of said flat circular bottom, said pie pan side being disposed upwardly from the plane of said flat circular bottom and radially outward from the center of said flat circular bottom such that the diameter of said pie pan rim is greater than the diameter of said flat circular bottom, a plane substantially parallel to the plane of said flat circular bottom passing through said pie pan rim for defining an open circular pie pan top and the space between said bottom, said top, and said side defining a pie pan interior adapted to receive a bottom layer of pie dough therein for substantially covering said bottom, said side, and at least a portion of said rim, said pie pan interior and said bottom layer of pie dough being adapted to receive a pie filling material therein and thereon, respectively, and said pie filling material being adapted to receive a second top layer of pie dough thereover, if desired, to form a complete pie ready for baking, said apparatus comprising:

pie divider means adapted to be inserted within said pie pan interior after said bottom layer of pie dough is added but before said pie filing material and said top layer of pie dough are added for dividing said pie into a plurality of different and distinct pie sections;

each of said different and distinct pie sections being adapted to receive a different and distinct pie filling material therein, and each of said different and distinct pie filling materials having a substantially equal baking time, and a different and distinct one of said pie filling materials being added to each of said plurality of different and distinct pie sections before said top layer of pie dough is placed thereof, said pie-divider means including first and second rigid V-shaped adjustable members positionable with their vertices pivotally connected to selectively divide said pie into four pie sections, each having a different and distinct pie filing, said members being movable to adjust the angle between the members for dividing said pie into sections so as to be at least one of equally dimensioned and unequally dimensioned.

* * * * *